United States Patent Office 3,507,723
Patented Apr. 21, 1970

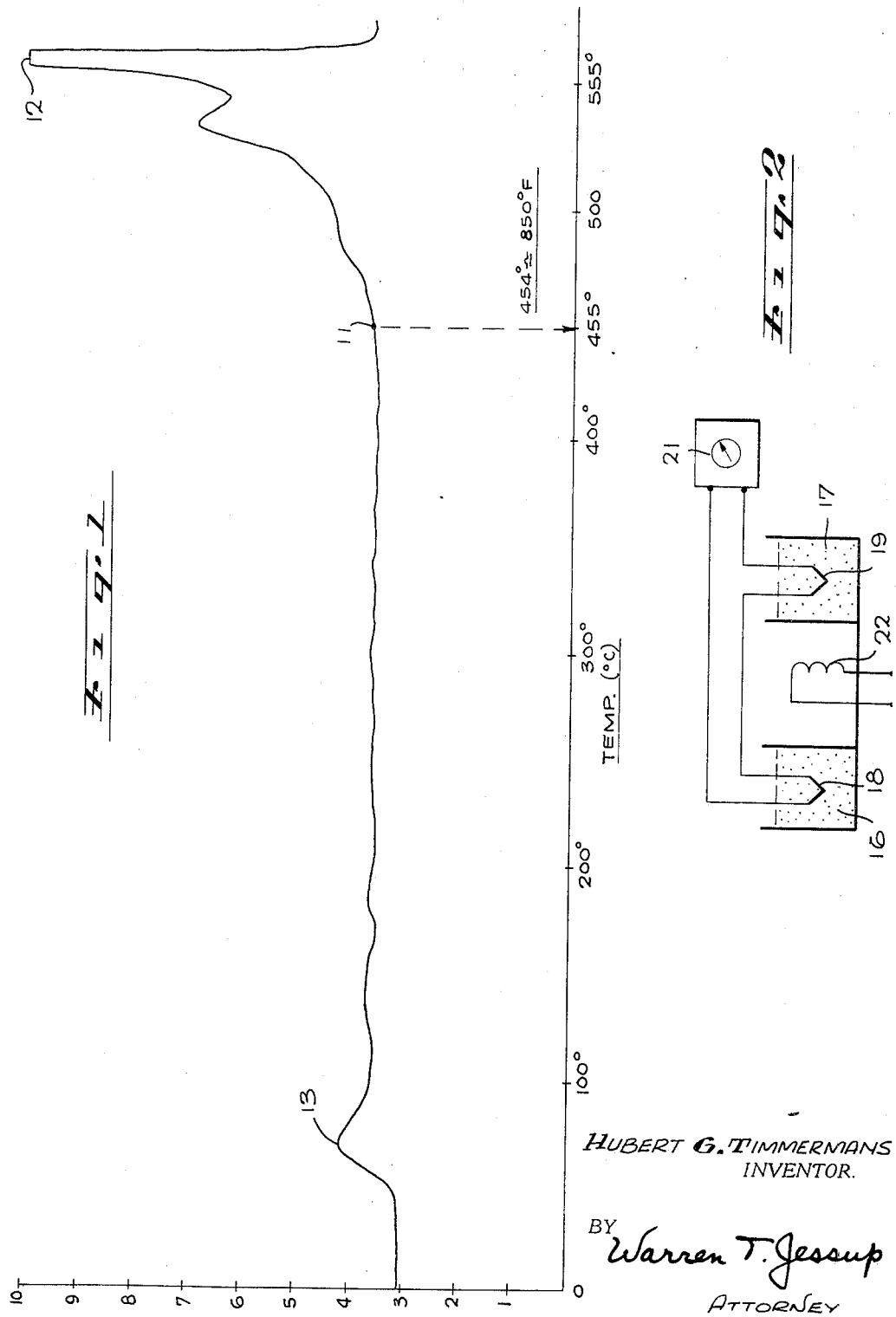

3,507,723
HIGH-TEMPERATURE IGNITION COMPOSITION OF TELLURIUM DIOXIDE, ALUMINUM, AND CARBON BLACK
Hubert G. Timmermans, Manhattan Beach, Calif., assignor to Space Ordnance Systems, Inc., El Segundo, Calif., a corporation of California
Filed Sept. 27, 1967, Ser. No. 671,044
Int. Cl. C06c 1/00, 1/02
U.S. Cl. 149—21      4 Claims

ABSTRACT OF THE DISCLOSURE

This is a pyrotechnic ignition mixture characterized by its ability to withstand a relatively high temperature for a long time without degrading, while still being susceptible to firing by a hot bridge wire. The mixture consists of aluminum about 17%, carbon black about 3%, and tellurium dioxide about 80%.

BACKGROUND OF THE INVENTION

Pyrotechnic ignition mixtures are widely employed in modern technology, for example, in space vehicles, where one-shot operation is desired; that is, where an operating force is required only once in the useful life of a particular component. The environment in which such ignition mixtures are used varies within extremely wide ranges. The mixtures, for example, must be capable of withstanding wide ranges of temperature without being degraded to the point where they either fail to operate reliably or alternatively, fire prematurely. One of the shortcomings of prior pyrotechnic ignition mixtures is that where very high environmental temperatures are expected, mixtures must be employed which are not capable of being fired by the conventional hot bridge wire, but other more expensive and sophisticated firing techniques must be employed.

SUMMARY OF THE INVENTION

The present invention constitutes a mixture of solid materials, preferably in powdered or granulated form, which can be fired by ordinary bridge wire techniques, yet which has the capability of withstanding unusually high ambient temperatures for extended periods of time without degradation. The invention consists of a mixture of fuel and oxidizer, the fuel comprising aluminum and carbon black, the oxidizer comprising tellurium dioxide.

BRIEF DESCRIPTION OF THE DRAWING

FIGURE 1 is a graph illustrating the response of the new mixture under conventional differential thermal analysis (DTA).

FIGURE 2 is a schematic illustration of the test system from which the graph of FIGURE 1 was derived.

DESCRIPTION OF THE PREFERRED EMBODIMENTS

The present invention consists of a mixture of powders or granules comprising fuel and oxidizer. The fuel consists of aluminum and carbon black, the oxidizer consists of tellurium dioxide.

The three ingredients are thoroughly mixed in dry powder form and may be stored indefinitely. The proportion of fuel to oxidizer, by weights, ranges from an amount of fuel required to achieve stoichiometry, to an amount 20% above such amount. The carbon component of the fuel preferably ranges from 1% to 4% by weight of the total mixture.

The most satisfactory proportion which has been discovered to date is about 17% aluminum, 3% carbon black and 80% tellurium dioxide, by weight. While particle size is not critical, the actual particle sizes which were employed to create the mixture discussed herein were:

| | Microns |
|---|---|
| Aluminum, average particle size, a.p.s. | 0.8 |
| Carbon black, a.p.s. | 0.4 |
| Tellurium dioxide, a.p.s. | 4.1 |

The proportions given above are somewhat on the fuel-rich side of stoichiometry, having approximately 6.5% more fuel than required for a true stoichiometric mixture. It is desirable to be on the fuel-rich side in order to be sure of compensating for the thin layer of aluminum oxide which inevitably forms on the surface of the powdered aluminum.

The function of the aluminum is to provide the heat-producing component of the fuel. Carbon provides the pressure-producing component of the fuel. As noted above, it has been found that the carbon content can be, for example, as small as 1% by weight of the total mixture, but the gas pressure on firing is somewhat lessened. If the carbon content goes over 3%, it has been found that the carbon claims so much of the oxidizer that the aluminum does not fire completely and thus the thermal output of the mixture, on firing, suffers.

The function of the tellurium dioxide is to provide an oxidizer for the two fuel components. Tellurium dioxide is preferred because, when combining with carbon, in the proportions stated herein, it is slightly exothermic. It, therefore, does not rob heat from the reaction produced by the oxidation or firing of the aluminum. Other oxidizers tend to be endothermic with carbon black and thus rob the reaction of some of the heat produced by the firing of the aluminum.

The stability of the present invention under high ambient temperatures is illustrated by the DTA plotted in FIGURE 1. In FIGURE 1 the ambient temperature in degrees centigrade to which the mixture was subjected is plotted as abscissa. The reaction of the material is plotted as ordinate. It will be noted that the material is quite stable up to about point 11 where, at about 453° C. (850° F.) the material starts to degrade, until the firing point 12 is reached at around 555° C. The low temperature blip at 13 does not, in fact, represent a reaction of the ignition mix, but is an aberration inherent in the testing system, as will be explained hereinafter.

The specific test charted in FIGURE 1 represented a mixture by weight of 17% aluminum, 3% carbon, and 80% tellurium dioxide. The weight of the sample was 100 milligrams, screened through a 60 mesh sieve. A 1 millivolt recorder was employed during the test, which involved a pair of chromelalumet thermocouples. The rate of temperature increase was 10° C. per minute. The inert reference material used in the DTA consisted of 100 milligrams of alumina. Seven crucibles containing 100 mg. of alumina each were also placed in the sample-holder for thermal balance. The theoretical calorific output of the sample was 963 calories per gram. The theoretical gas output was 0.25 mole.

The DTA of FIGURE 1 employed conventional testing techniques illustrated in FIGURE 2. In this system, an inert reference mixture 16 is compared to the mixture 17 under test. The difference in reaction between the two mixtures was measured by thermocouples 18 and 19 differentially connected in series and read out by a meter 21. The temperature of both mixtures is steadily elevated at a uniform rate by applying increasing current to a heating coil 22.

The system of FIGURE 2 is first calibrated by using a reference mix of alumina at 16 and keeping the thermocouple 19 at a constant temperature, as for example by emmersing it in ice water at 17. The current through the coil 22 is then raised at a fixed rate and plotted against the reading obtained in the meter 21. In this way, the temperature versus time characteristic of the inert mixture at 16 is first obtained as a calibration level. The system is then cooled to ambient temperature and the test is re-run with the pyrotechnic ignition mixture 17 in place of the ice water. The temperature is again steadily elevated by the coil 22. The reading of the meter 21 now measures the differential in thermal reaction between the mixtures 16 and 17. As noted in FIGURE 1, there is substantially no differential in reaction as the temperature is elevated until about point 11 is reached. This indicates that the mixture 17 is virtually inert, i.e., stable, up to this temperature. Above the point 11 the mixture 17 starts to degrade, i.e., generate heat on its own, as shown by the rising curve, until finally it explodes at point 12.

The blip at 16 is a normal phenomenon occurring at relatively low temperature, and is due to the inevitable asymmetry in the system shown in FIGURE 2, in which heat flow is not uniform into the two containers 16 and 17. Once the relatively low range at 13 has been passed, the system output, for practical purposes, assumes virtual symmetry, within satisfactory tolerances. From that point on, the DTA readings may be relied on.

The mixture of the present invention may be fired in conventional firing time, i.e., around 10 milliseconds and requires only a somewhat hotter, but still conventional, bridge wire, which develops a temperature of around 2200° F. A cooler bridge wire, e.g., one developing about 1600° F. will also fire the mixture of the present invention, although the firing time is considerably extended to around 50 milliseconds.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:
1. Pyrotechnic ignition mixture consisting essentially of:
   fuel and oxidizer,
   the proportion of fuel to oxidizer, by weight, ranging from stoichiometry to about 20% above stoichiometry,
   said oxidizer comprising tellurium dioxide,
   said fuel comprising aluminum and carbon black,
   said carbon black constituting from 1% to 4% by weight, of the mixture.

2. The mixture of claim 1, consisting essentially of, by weight, about:

| | Percent |
|---|---|
| Tellurium dioxide | 80 |
| Aluminum | 17 |
| Carbon black | 3 |

3. The mixture of claim 2, wherein said fuel and oxidizer are in powder form.

4. The mixture of claim 1, wherein said fuel and oxidizer are in powder form having about the following average particle sizes:

| | Microns |
|---|---|
| Tellurium dioxide | 4.1 |
| Aluminum | 0.8 |
| Carbon black | 0.4 |

References Cited

UNITED STATES PATENTS

| 2,607,672 | 8/1952 | Spaeth et al. | 149—37 |
| 2,830,885 | 4/1958 | Kerr et al. | 149—37 |
| 2,892,695 | 6/1959 | Zebree | 149—37 |
| 2,953,447 | 9/1960 | Schulz | 149—37 |
| 3,009,418 | 11/1961 | Zebree | 149—37 X |
| 3,094,933 | 6/1963 | Zebree | 149—37 X |
| 3,113,519 | 12/1963 | Zebree | 149—37 X |

CARL D. QUARFORTH, Primary Examiner

S. J. LECHERT, Assistant Examiner

U.S. Cl. X.R.

149—31, 110, 114